US012646039B2

(12) United States Patent
Albero et al.

(10) Patent No.: US 12,646,039 B2
(45) Date of Patent: *Jun. 2, 2026

(54) DIGITAL CHECK DISBURSEMENT USING POINT OF SALE DEVICES

(71) Applicant: Bank of America Corporation, Charlotte, NC (US)

(72) Inventors: George Albero, Charlotte, NC (US); Maharaj Mukherjee, Poughkeepsie, NY (US); Benjamin D. Moores, Ventura, CA (US)

(73) Assignee: Bank of America Corporation, Charlotte, NC (US)

( * ) Notice: Subject to any disclaimer, the term of this patent is extended or adjusted under 35 U.S.C. 154(b) by 40 days.

This patent is subject to a terminal disclaimer.

(21) Appl. No.: 18/756,016

(22) Filed: Jun. 27, 2024

(65) Prior Publication Data

US 2024/0346466 A1 Oct. 17, 2024

Related U.S. Application Data

(63) Continuation of application No. 17/720,873, filed on Apr. 14, 2022, now Pat. No. 12,086,768.

(51) Int. Cl.
*G06Q 20/04* (2012.01)
*G06K 7/14* (2006.01)
(Continued)

(52) U.S. Cl.
CPC ....... *G06Q 20/0425* (2013.01); *G06K 7/1417* (2013.01); *G06K 19/06037* (2013.01);
(Continued)

(58) Field of Classification Search
CPC ............. G06Q 20/0425; G06Q 20/204; G06Q 20/3274; G06Q 20/40145; G06Q 20/4015;
(Continued)

(56) References Cited

U.S. PATENT DOCUMENTS 6,823,318 B1 * 11/2004 Creswell ............ G06Q 30/0613
705/44
8,059,881 B1 11/2011 Thomas et al.
(Continued)

FOREIGN PATENT DOCUMENTS

KR      20190032548 A      3/2019
WO      WO-2012104872 A1 *  8/2012  ......... G06Q 20/3274

OTHER PUBLICATIONS

"Virtual check announces a comprehensive echeck payment platform designed to enhance small business merchant services", Oct. 10, 2017, ICT Monitor Worldwide (Year: 2017).*
(Continued)

*Primary Examiner* — Duan Zhang
(74) *Attorney, Agent, or Firm* — Banner & Witcoff, Ltd.

(57) ABSTRACT

Aspects of the disclosure relate to digital check processing. A computing platform may receive a check image from a user device. The computing platform may configure, based on the check image, a digital check for use in conducting transactions between the user device and point of sale devices, which may include generating a QR code for the check. The computing platform may send, to the user device, the digital check, which may enable the user device to execute a transaction with a first point of sale device. The computing platform may receive, from the first point of sale device, a request to execute the transaction. The computing platform may direct an event processing server to process the transaction, which may cause the event processing server to execute a transfer of funds from an account of the initial payor to an enterprise account of the first point of sale device.

16 Claims, 11 Drawing Sheets

(51) Int. Cl.

| | |
|---|---|
| *G06K 19/06* | (2006.01) |
| *G06Q 20/20* | (2012.01) |
| *G06Q 20/32* | (2012.01) |
| *G06Q 20/40* | (2012.01) |

(52) U.S. Cl.
CPC ....... *G06Q 20/204* (2013.01); *G06Q 20/3274* (2013.01); *G06Q 20/40145* (2013.01); *G06Q 20/4015* (2020.05); *G06Q 20/407* (2013.01)

(58) Field of Classification Search
CPC .... G06Q 20/407; G06Q 20/20; G06K 7/1417; G06K 19/06037
See application file for complete search history.

(56) References Cited

U.S. PATENT DOCUMENTS

| | | | |
|---|---|---|---|
| 9,430,852 B2 | 8/2016 | Tatham et al. | |
| 10,621,660 B1 | 4/2020 | Medina et al. | |
| 10,706,466 B1 | 7/2020 | Ethington et al. | |
| 10,748,122 B1 | 8/2020 | Yaqub et al. | |
| 10,853,800 B1* | 12/2020 | Meyer | G06Q 20/38215 |
| 10,896,408 B1 | 1/2021 | Prasad et al. | |
| 10,896,409 B2 | 1/2021 | Kang | |
| 10,977,624 B2 | 4/2021 | Kurian et al. | |
| 10,990,912 B2 | 4/2021 | Dravneek et al. | |
| 11,030,682 B1 | 6/2021 | Hockey et al. | |
| 11,068,976 B1 | 7/2021 | Voutour et al. | |
| 11,087,293 B1 | 8/2021 | Yan | |
| 11,120,158 B2 | 9/2021 | Hockey et al. | |
| 11,222,315 B1 | 1/2022 | Prasad et al. | |
| 11,232,517 B1 | 1/2022 | Medina et al. | |
| 11,250,397 B2 | 2/2022 | Hunter et al. | |
| 11,756,147 B1* | 9/2023 | Smith | G06T 1/0021 |
| | | | 705/45 |
| 11,922,379 B1* | 3/2024 | Thiele | G06Q 20/108 |
| 2003/0056104 A1 | 3/2003 | Carr et al. | |
| 2004/0139204 A1 | 7/2004 | Ergezinger et al. | |
| 2010/0280859 A1 | 11/2010 | Frederick, II | |
| 2010/0287097 A1 | 11/2010 | Treadwell | |
| 2014/0129433 A1 | 5/2014 | Rosenberger | |
| 2014/0278576 A1 | 9/2014 | Mariyal et al. | |
| 2014/0372295 A1 | 12/2014 | Tatham et al. | |
| 2015/0032605 A1* | 1/2015 | Williams | G06Q 20/042 |
| | | | 705/39 |
| 2018/0285836 A1* | 10/2018 | Enobakhare | G06Q 20/042 |
| 2018/0349889 A1* | 12/2018 | Ghosh | G06Q 20/3674 |

| | | | |
|---|---|---|---|
| 2019/0189246 A1 | 6/2019 | Colavin et al. | |
| 2019/0354941 A1 | 11/2019 | Welch | |
| 2020/0126047 A1 | 4/2020 | Megerdichian et al. | |
| 2020/0160286 A1 | 5/2020 | Vukich et al. | |
| 2020/0334671 A1 | 10/2020 | Davies et al. | |
| 2020/0364703 A1 | 11/2020 | Joveski et al. | |
| 2021/0035073 A1 | 2/2021 | Gupta | |
| 2021/0042724 A1* | 2/2021 | Rathod | G06F 16/535 |
| 2021/0158309 A1 | 5/2021 | McGinlay et al. | |
| 2021/0272123 A1 | 9/2021 | Burke | |
| 2022/0058637 A1* | 2/2022 | Yan | G06Q 20/0425 |
| 2022/0067674 A1 | 3/2022 | Yan | |
| 2022/0253839 A1 | 8/2022 | Kolchin | |
| 2023/0011788 A1 | 1/2023 | Wong et al. | |
| 2023/0060464 A1* | 3/2023 | Ceesay | G06Q 20/042 |
| 2023/0259924 A1* | 8/2023 | Zamora | G06Q 20/389 |
| | | | 705/64 |
| 2023/0325790 A1 | 10/2023 | Albero et al. | |
| 2023/0334442 A1 | 10/2023 | Albero et al. | |
| 2023/0342773 A1 | 10/2023 | Bose et al. | |
| 2023/0351337 A1 | 11/2023 | Albero et al. | |
| 2023/0418921 A1 | 12/2023 | Safary | |

OTHER PUBLICATIONS

Dec. 5, 2024—(US) Office Action—U.S. Appl. No. 17/733,069.
Feb. 3, 2023—(US) Non Final Office Action—U.S. Appl. No. 17/717,561.
Nikita Singh et al. "Blockchain based e-cheque clearing framework" Scalable Computing: Practice and Experience 20.3 (2019) pp. 511-526.
May 5, 2023—(US) Office Action—U.S. Appl. No. 17/717,656.
Jacob Katy et al., "Digital Checks as Electronic Payment Orders" Federal Reserve Bank of Chicago, https://www.chicagofed.org/-/media/publications/policy-discussion-pappers/2009/pdp2009-5-pdf.pdf, Nov. 17, 2009, pp. 1-28.
May 31, 2023—(US) Notice of Allowance—U.S. Appl. No. 17/717,561.
Aug. 3, 2023—(US) Notice of Allowance—U.S. Appl. No. 17/717,561.
Nov. 17, 2023—(US) Office Action—U.S. Appl. No. 17/717,656.
Jan. 2, 2024—(US) Office Action—U.S. Appl. No. 17/720,873.
Jan. 25, 2024—(US) Office Action—U.S. Appl. No. 17/733,069.
Apr. 29, 2024—(US) Office Action—U.S. Appl. No. 17/717,656.
May 9, 2024—(US) Office Action—U.S. Appl. No. 17/733,069.
"Virtual check announces a comprehensive echeck payment platform designed to enhance small business merchant services", Oct. 19, 2017, ICT Monitor Worldwide.
May 20, 2024—(US) Notice of Allowance—U.S. Appl. No. 17/720,873.
May 28, 2024—(US) Notice of Allowance—U.S. Appl. No. 18/369,994.

* cited by examiner

Distributed Ledger Host
System
103

User Device
104

Enterprise Application
Host Platform
102

Network
101

First Point Of Sale
Device
105

Second Point Of Sale
Device
107

Event Processing
Server
106

100

305

Check Processing Application

Date: March 23, 2022

Pay to The Order of: _____Person #1_____    $150.00

310    _____One Hundred Fifty_____    Dollars

One Hundred Fifty Dollars Zero Cents

_____

405

Check Processing Application

Based on your location, the following businesses have been identified. Please select the business with which you are conducting a transaction.

Business #1
Business #2
Business #3

505

605

DIGITAL CHECK DISBURSEMENT USING POINT OF SALE DEVICES

CROSS-REFERENCE TO RELATED APPLICATION

This application is a continuation of U.S. Ser. No. 17/720,873 filed on Apr. 14, 2022, which is entitled "DIGITAL CHECK DISBURSEMENT USING POINT OF SALE DEVICES" which is incorporated by reference herein in its entirety.

BACKGROUND

Aspects of the disclosure relate to computer hardware and software for event processing. In some instances, individuals may use enterprise applications (such as mobile banking applications) to perform events such as depositing checks. For example, the application may be used to capture an image of the check, and may process the check for deposit into the individual's account accordingly. In some instances, however, an individual may want to perform other functions beyond a simple deposit into a personal account. Such instances may require the individual to deposit the check prior to using the corresponding funds. As mobile applications are increasingly used for check processing, it may be important to expand the functionality of such applications to increase client convenience, while maintaining the security parameters offered by traditional methods of providing such functions.

SUMMARY

Aspects of the disclosure provide effective, efficient, scalable, and convenient technical solutions that address and overcome the technical problems associated with digital event processing. In accordance with one or more embodiments of the disclosure, a computing platform comprising at least one processor, a communication interface, and memory storing computer-readable instructions may receive a check image from a user device, which may depict a check from an initial payor to a recipient user corresponding to the user device. The computing platform may configure, based on the check image, a digital check for use in conducting transactions between the user device and one or more point of sale devices, which may include generating a quick response (QR) code representative of the check. The computing platform may send, to the user device, the digital check including the QR code, which may enable the user device to execute a transaction with a first point of sale device of the one or more point of sale devices. The computing platform may receive, from the first point of sale device, a request to execute the transaction. The computing platform may send, to an event processing server, one or more commands directing the event processing server to process the transaction, which may cause the event processing server to execute a transfer of funds from an account of the initial payor to an enterprise account of the first point of sale device, without transferring the funds to an account of the recipient user.

In one or more instances, configuring the digital check may include embedding a digital chip into the digital check. In one or more instances, executing the transaction may include scanning, by the first point of sale device and from a display of the user device, the QR code.

In one or more examples, the computing platform may validate, after receiving the request to execute the transaction, the digital check, where validating the digital check may include verifying one of more of: 1) an account of the initial payor has sufficient funds to support a deposit of the digital check, or 2) an enterprise corresponding to the first point of sale device is an intended recipient of the digital check. In one or more examples, validating the digital check may include one or more of: 1) validating, using a distributed ledger corresponding to the digital check, the digital check, or 2) validating, using a digital chip embedded in the digital check, the digital check.

In one or more instances, the computing platform may modify, after execution of the transfer of funds from the account of the initial payor to the enterprise account of the first point of sale device, the distributed ledger to indicate the transfer of the funds. In one or more instances, executing the transfer of funds may include transferring a portion of the funds corresponding to the digital check.

In one or more examples, configuring the digital check for use in conducting transactions between the user device and the one or more point of sale devices may include: 1) identifying a geolocation of the user device; 2) identifying, based on the geolocation of the user device, one or more enterprises; 3) sending, to the user device, a notification of the one or more enterprises; and 4) based on receiving a user input selecting an enterprise of the one or more enterprises, configuring the digital check for use in conducting transactions between the user device and a point of sale device associated with the enterprise.

In one or more instances, the one or more point of sale devices may be uniquely configured to process digital checks from an enterprise associated with the computing platform. In one or more instances, configuring the digital check may include depositing funds of the digital check into a mobile pay application of the user device.

In one or more examples, funds of the digital check might not be deposited to an account of the recipient user. In one or more examples, the computing platform may receive, from the user device and after receiving a request to execute a second transaction from a second point of sale device, a check transfer cancellation request, which may request cancellation of transfer of the digital check. The computing platform may cancel, without causing a transfer of funds from the account of the initial payor to an enterprise account of the second point of sale device, the second transaction.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, conventional systems are not configured to permit digitally endorsing a check in a mobile application to allow partial deposits to multiple of one's own accounts simultaneously and/or pay with a partial check transfer to a merchant with a scan at a point of sale. A mobile check disburser may integrate with merchant services as described further below. A scan of a check may be disbursed to a merchant. A point of sale code may be generated in an application that may have all requisite information (e.g., payee, amount, financial institution validation, and/or other information). The acceptance of the code may update a remaining amount on the check. The merchant service may allow for those without a bank account to go directly to a merchant, while bypassing check cashing services. In some instances, the payee may pay multiple merchants in a network or contact list at the same time.

In doing so, digital disbursements of check images may be facilitated to merchants, and may provide faster services by bypassing multiple current steps and helping individuals who might not have a bank account.

Figure 1A:
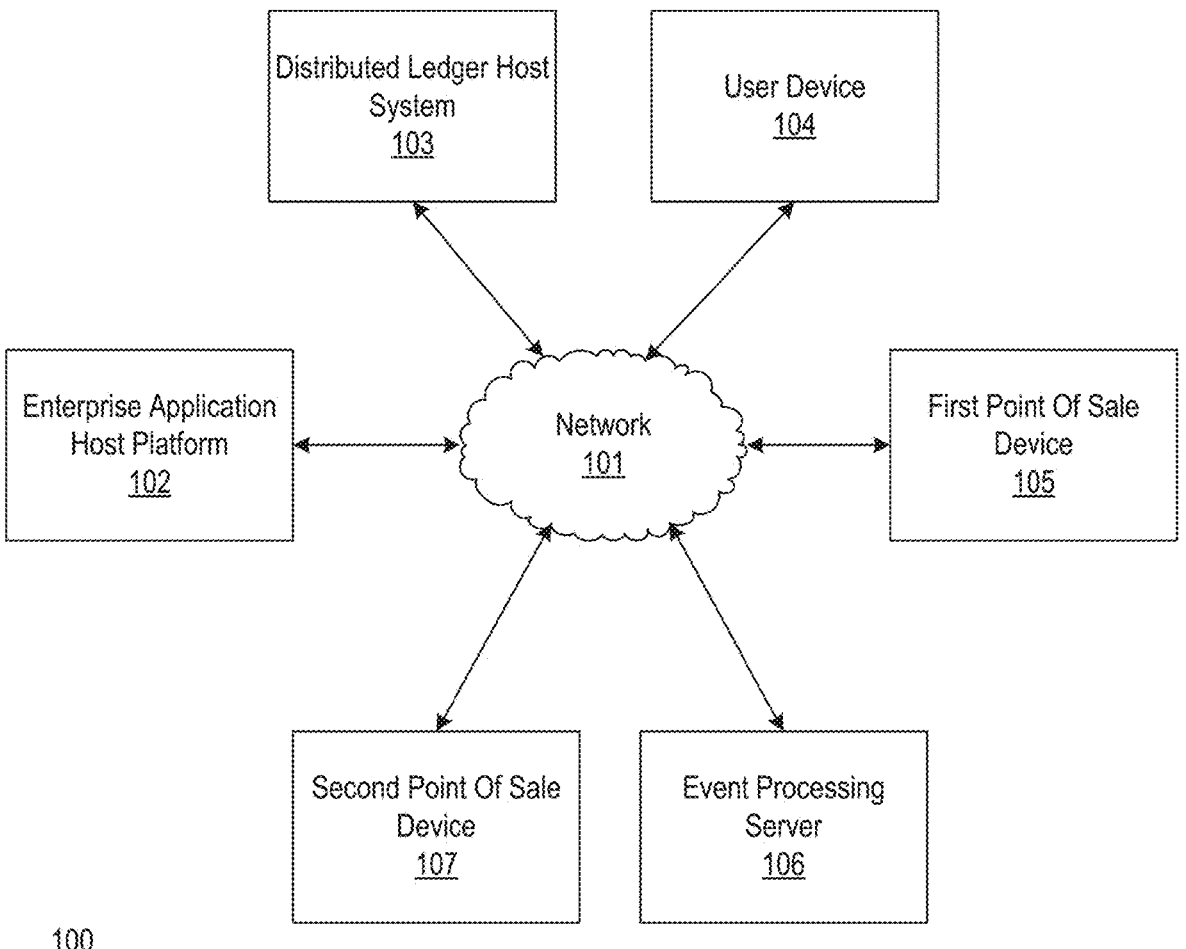
FIGS. 1A and 1B depict an illustrative computing architecture for executing digital check disbursements with point of sale devices in accordance with one or more example embodiments.
Figure 1B:
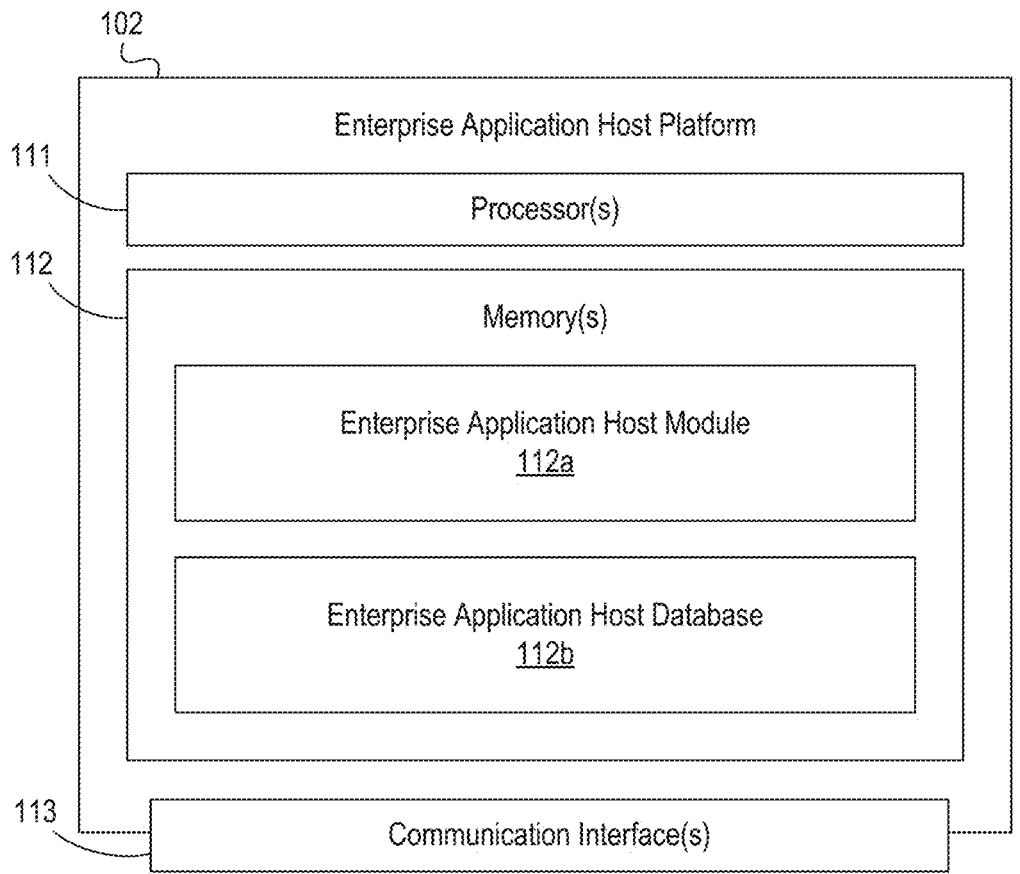

FIGS. 1A-1B depict an illustrative computing environment for executing digital check disbursements with point of sale devices in accordance with one or more example embodiments. Referring to FIG. 1A, computing environment 100 may include one or more computer systems. For example, computing environment 100 may include enterprise application host platform 102, distributed ledger host system 103, user device 104, first point of sale device 105, event processing server 106, and/or second point of sale device 107.

As described further below, enterprise application host platform 102 may be a computer system that includes one or more computing devices (e.g., servers, server blades, or the like) and/or other computer components (e.g., processors, memories, communication interfaces) that may be used to host an enterprise application (e.g., a mobile banking application) as described further below. In these instances, the enterprise application host platform 102 may be configured to provide or otherwise support one or more application services (e.g., check processing, and/or other services). In some instances, the enterprise application host platform 102 may comprise an independent computing platform. In other instances, the enterprise application host platform 102 may be represented by one or more client device modules integrated into or otherwise stored at various client devices (e.g., user device 104, and/or other user devices).

Distributed ledger host system 103 may be a computer system that includes one or more computing devices (e.g., servers, server blades, or the like) and/or other computer components (e.g., processors, memories, communication interfaces) that may be used to support a distributed ledger (e.g., blockchain, holochain, and/or other distributed ledger). In some instances, the distributed ledger host system 103 may be configured to communicate with the enterprise application host platform 102 to provide check validation and/or otherwise record transactions/events. In some instances, the distributed ledger host system 103 may be an optional system in the computing environment 100.

User device 104 may be and/or otherwise include a laptop computer, desktop computer, mobile device, tablet, smartphone, and/or other device that may be used by an individual to access a client application (e.g., a mobile banking application, or the like). In these instances, the user device 104 may be configured with a camera, which may be used, e.g., to capture check images. In some instances, user device 104 may be configured to display one or more user interfaces (e.g., digital check interfaces, quick response (QR) interfaces, point of sale interfaces, or the like).

First point of sale device 105 may be and/or otherwise include a credit card scanner, credit card reader, mobile device scanner, touch sensor, mobile device, and/or other point of sale device configured to process transactions (e.g., between a customer and merchant). In some instances, the first point of sale device 105 may be configured to process a machine-readable code, such as a QR code (e.g., displayed on the user device 104) to deposit funds from a check. Additionally or alternatively, the first point of sale device 105 may be configured to process a transaction by communicating with the user device 104 to extract funds from a mobile pay wallet or account (which may, e.g., be configured for access by the user device 104). In some instances, the first point of sale device 105 may be uniquely configured to support the type of transactions described herein, which may, in some instances, be supported uniquely for customers of an enterprise organization corresponding to the enterprise application host platform 102 (e.g., supports such transactions only for customers of a particular financial institution, or the like).

Event processing server 106 may be a computer system that includes one or more computing devices (e.g., servers, server blades, or the like) and/or other computer components (e.g., processors, memories, communication interfaces) that may be used to process events (e.g., route funds between accounts, execute transactions, and/or otherwise perform enterprise functions). In some instances, the event processing server 106 may be independent from the enterprise application host platform 102, and in other instances, the event processing server 106 may be part of or otherwise integrated into the enterprise application host platform 102.

Second point of sale device 107 may be and/or otherwise include a credit card scanner, credit card reader, mobile device scanner, touch sensor, mobile device, and/or other point of sale device configured to process transactions (e.g., between a customer and merchant). In some instances, the second point of sale device 107 may be configured to process a machine-readable code, such as a QR code (e.g., displayed on the user device 104) to deposit funds from a check. Additionally or alternatively, the second point of sale device 107 may be configured to process a transaction by communicating with the user device 104 to extract funds from a mobile pay wallet or account (which may, e.g., be configured for access by the user device 104). In some instances, the second point of sale device 107 may be uniquely configured to support the type of transactions described herein, which may, in some instances, be supported uniquely for customers of an enterprise organization corresponding to the enterprise application host platform 102 (e.g., supports such transactions only for customers of a particular financial institution, or the like).

Computing environment 100 also may include one or more networks, which may interconnect enterprise application host platform 102, distributed ledger host system 103, user device 104, first point of sale device 105, event processing server 106, and/or second point of sale device 107. For example, computing environment 100 may include a network 101 (which may interconnect, e.g., enterprise application host platform 102, distributed ledger host system 103, user device 104, first point of sale device 105, event processing server 106, and/or second point of sale device 107).

In one or more arrangements, enterprise application host platform 102, distributed ledger host system 103, user device 104, first point of sale device 105, event processing server 106, and/or second point of sale device 107 may be any type of computing device capable of sending and/or receiving requests and processing the requests accordingly. For example, enterprise application host platform 102, distributed ledger host system 103, user device 104, first point of sale device 105, event processing server 106, second point of sale device 107, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of enterprise application host platform 102, distributed ledger host system 103, user device 104, first point of sale device 105, event processing server 106, and/or second point of sale device 107 may, in some instances, be special-purpose computing devices configured to perform specific functions.

Referring to FIG. 1B, enterprise application host platform 102 may include one or more processors 111, memory 112, and communication interface 113. A data bus may interconnect processor 111, memory 112, and communication interface 113. Communication interface 113 may be a network interface configured to support communication between enterprise application host platform 102 and one or more networks (e.g., network 101, or the like). Memory 112 may include one or more program modules having instructions that when executed by processor 111 cause enterprise application host platform 102 to perform one or more functions described herein and/or one or more databases that may store and/or otherwise maintain information which may be used by such program modules and/or processor 111. In some instances, the one or more program modules and/or databases may be stored by and/or maintained in different memory units of enterprise application host platform 102 and/or by different computing devices that may form and/or otherwise make up enterprise application host platform 102. For example, memory 112 may have, host, store, and/or include enterprise application host module 112*a* and/or enterprise application host database 112*b*.

Enterprise application host module 112*a* may have instructions that direct and/or cause enterprise application host module 112*a* to facilitate digital check transactions with point of sale devices, as discussed in greater detail below.

Enterprise application host database 112*b* may store information used by enterprise application host module 112*a* and/or enterprise application host platform 102 in application of advanced techniques to facilitate digital check transactions with point of sale devices, and/or in performing other functions.

Figure 2A:
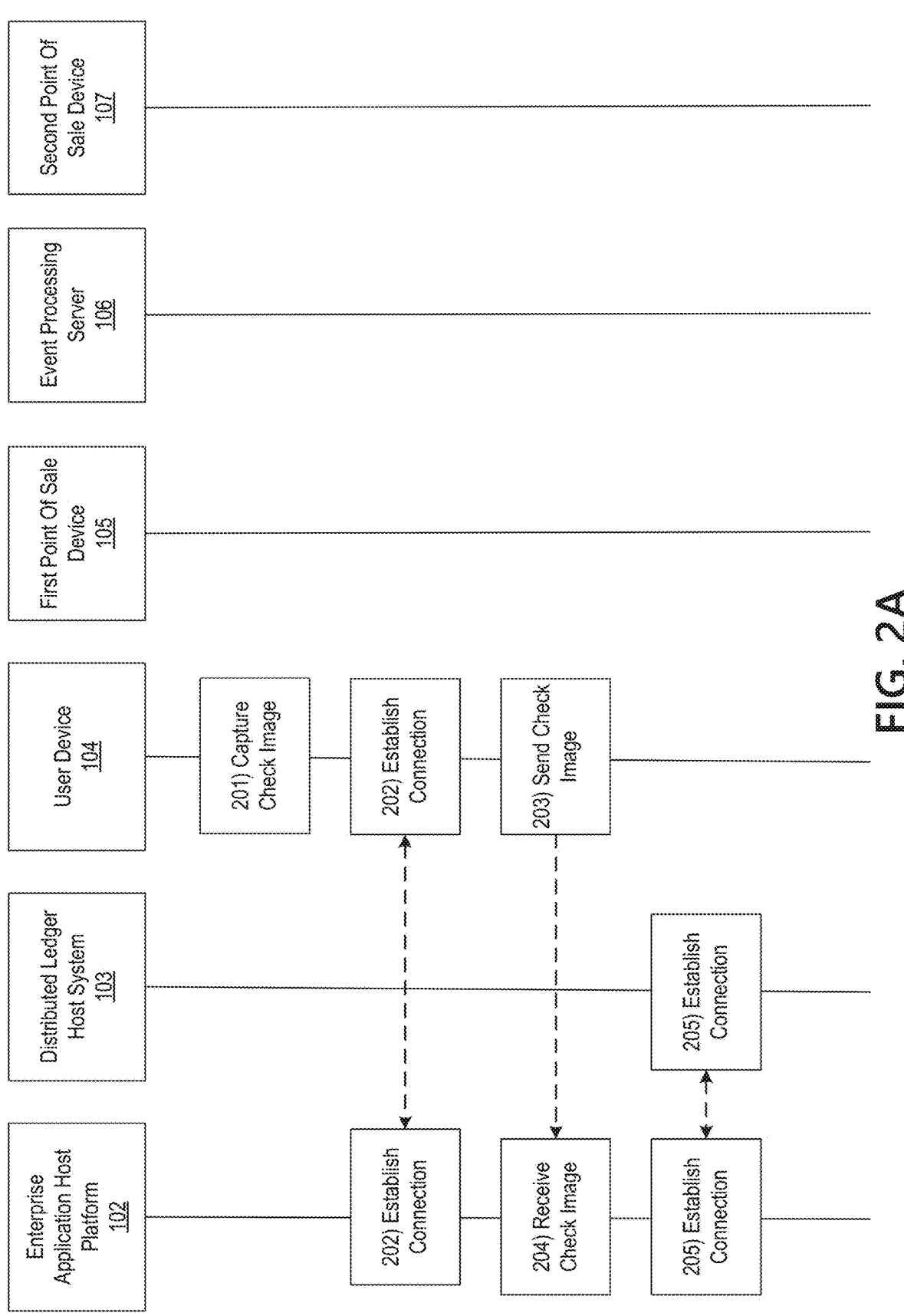
FIGS. 2A-2F depict an illustrative event sequence for executing digital check disbursements with point of sale devices in accordance with one or more example embodiments.

FIGS. 2A-2F depict an illustrative event sequence for executing digital check disbursements with point of sale devices in accordance with one or more example embodiments. Referring to FIG. 2A, at step 201, the user device 104 may capture a check image (e.g., similar to digital check 305, which is shown in FIG. 3). For example, the user device 104 may capture an image of a check, directed from an initial payor to a recipient (e.g., a user of the user device 104—referred to as the first user). For example, the check may include an initial value of funds to be transferred from the initial payor to the first user. In some instances, the user device 104 may capture the check image using an enterprise application (e.g., a mobile banking application) installed at the user device 104 and/or supported by the enterprise application host platform 102.

At step 202, the user device 104 may establish a connection with the enterprise application host platform 102. For example, the user device 104 may establish a first connection with the enterprise application host platform 102 to link the user device 104 to the enterprise application host platform 102 (e.g., in preparation for sending the check image). In some instances, the user device 104 may identify whether a connection is already established with the enterprise application host platform 102. If a connection is already established with the enterprise application host platform 102, the user device 104 might not re-establish the connection. If a connection is not yet established with the enterprise application host platform 102, the user device 104 may establish the first connection as described herein.

At step 203, the user device 104 may send the check image, captured at step 201, to the enterprise application host platform 102. For example, the user device 104 may send the first check image to the enterprise application host platform 102 while the first connection is established.

At step 204, the enterprise application host platform 102 may receive the check image sent at step 203. For example, the enterprise application host platform 102 may receive the check image via the communication interface 113 and while the first connection is established.

At step 205, the enterprise application host platform 102 may establish a connection with the distributed ledger host system 103. For example, the enterprise application host platform 102 may establish a second connection with the distributed ledger host system 103 to link the enterprise application host platform 102 with the distributed ledger host system 103 (e.g., in preparation for storing the check image). In some instances, the enterprise application host platform 102 may identify whether a connection is already established with the distributed ledger host system 103. If a connection is already established with the distributed ledger host system 103, the enterprise application host platform 102 might not re-establish the connection. If a connection is not yet established with the distributed ledger host system 103, the enterprise application host platform 102 may establish the second connection as described herein.

Figure 2B:
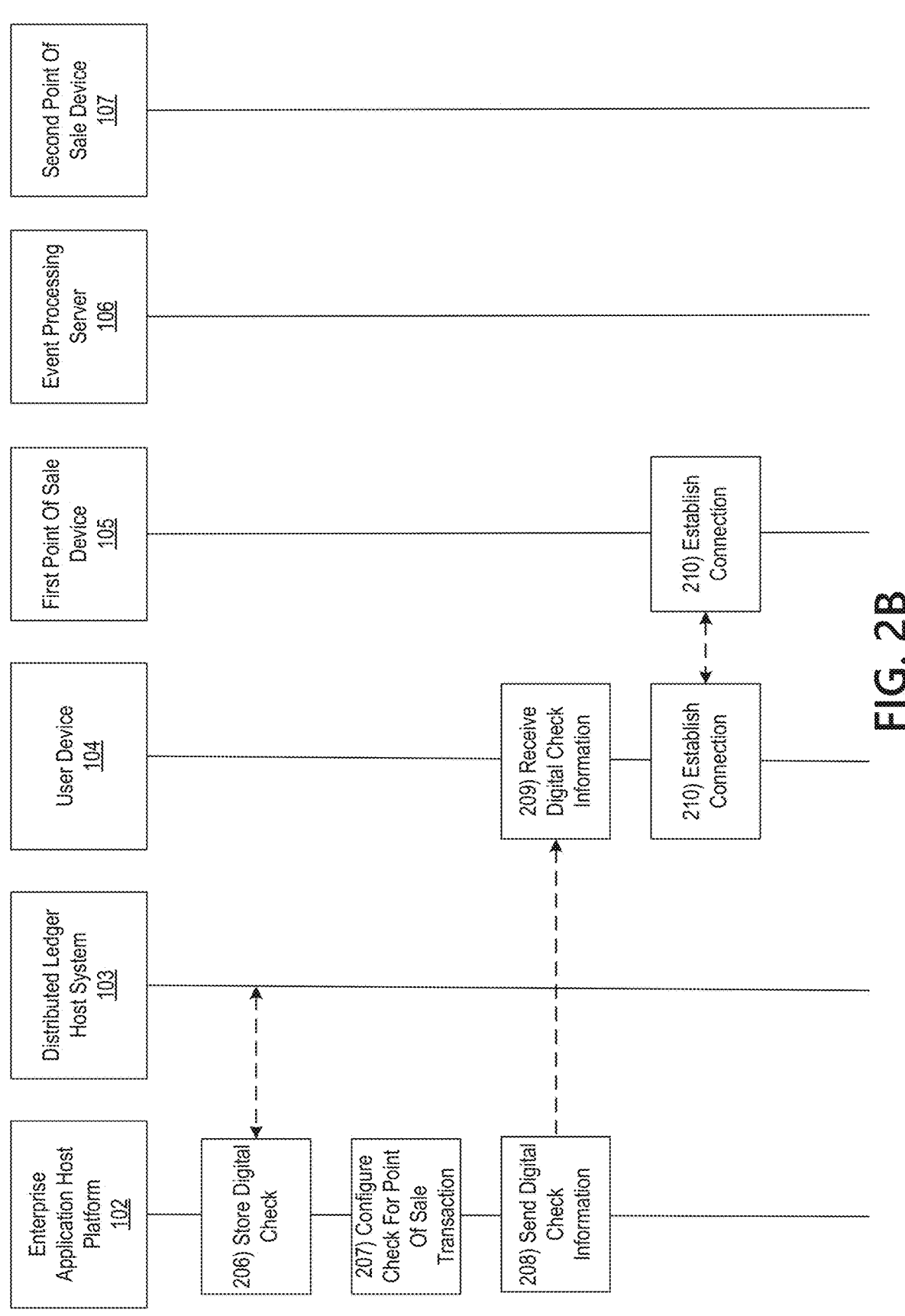
Figures 3, 4:
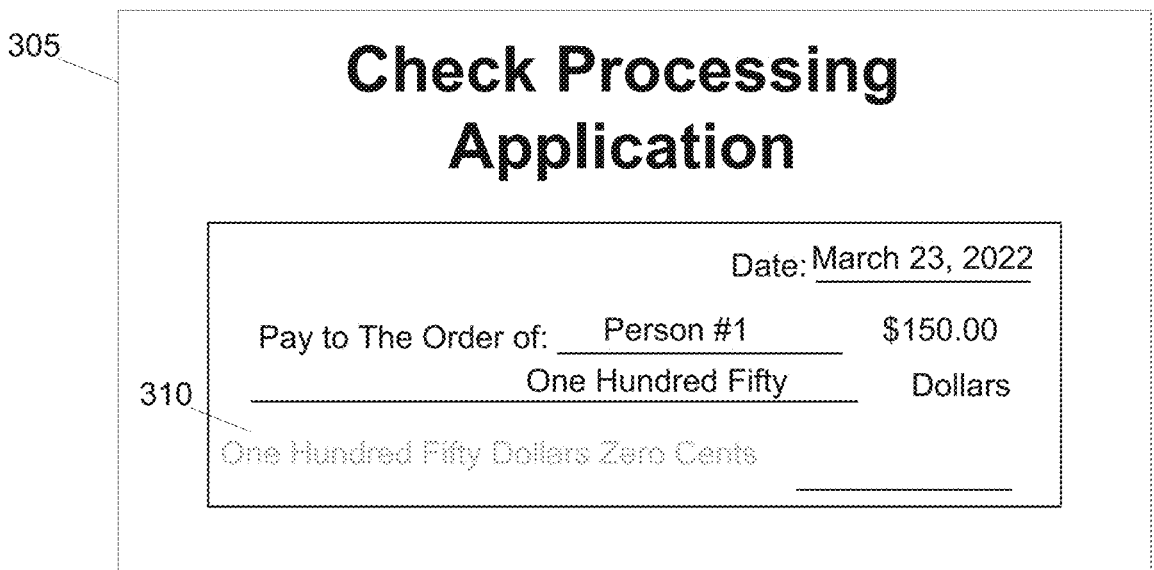
FIGS. 3-5 depict illustrative graphical user interfaces depicting execution of digital check disbursements with point of sale devices in accordance with one or more example embodiments.
Figure 6:
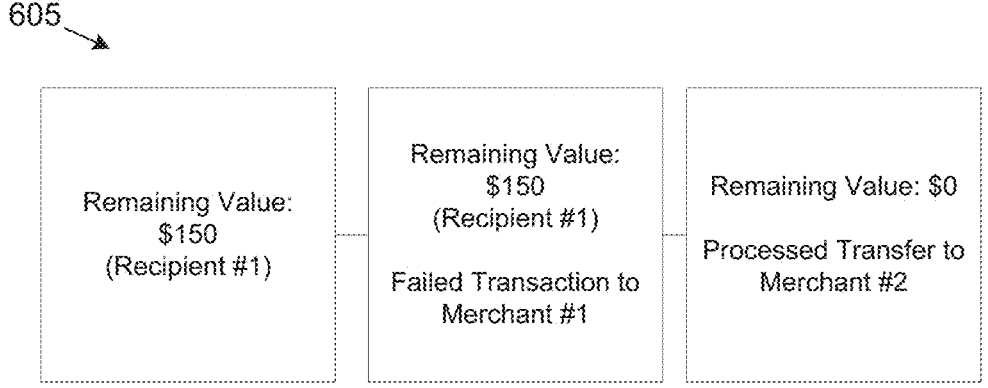
FIG. 6. depicts an illustrative distributed ledger for executing digital check disbursements with point of sale devices in accordance with one or more example embodiments.

Referring to FIG. 2B, at step 206, the enterprise application host platform 102 may store information of the check image/digital check in a distributed ledger. For example, for a new check/check image, the enterprise application host platform 102 may create a new chain for a distributed ledger, and may create an initial block in the chain that includes an identity of the initial payor, the recipient, an amount of funds to be transferred, and/or other information (e.g., similar to distributed ledger 605, as shown in FIG. 6). In some instances, in creating the initial block, the enterprise application host platform 102 may communicate with the distributed ledger host system 103 to validate the check (e.g., to verify that the initial payor has sufficient funds to support a transfer of the indicated value of the check from their account to another account). In these instances, the enterprise application host platform 102 and/or distributed ledger host system 103 may add the initial block to the distributed ledger once the check is validated, and may (in some instances) include an indication within the block that the digital check is validated. In some instances, in storing the first digital check to the distributed ledger, the enterprise application host platform 102 and/or the distributed ledger host system 103 may convert the digital check to a machine-readable code, such as a quick response (QR) code, and may store the QR code to the distributed ledger. In some instances, the distributed ledger may be a blockchain, holo-chain, and/or other distributed ledger. In some instances, the enterprise application host platform 102 may communicate with the distributed ledger host system 103 via the communication interface 113 and while the second connection is established.

In some instances, the enterprise application host platform 102 may validate the digital check with or without use of the distributed ledger. In some instances, after validating the digital check, the enterprise application host platform 102 may embed a digital chip, watermark, and/or other feature into the digital check, which may indicate that the first digital check is validated. In these instances, the enterprise application host platform 102 may store information of the validated digital check (e.g., using the distributed ledger, in storage of the enterprise application host platform 102, and/or otherwise).

At step 207, the enterprise application host platform 102 may configure the digital check for point of sale transactions (e.g., with enterprises corresponding to the first point of sale device 105, second point of sale device 107, and/or other point of sale devices). For example, the enterprise application host platform 102 may include the value, sender, and/or recipient for the digital check as a watermark 310 (e.g., as shown in FIG. 3). In some instances, the enterprise application host platform 102 may also redact any personal identifiable information identifying the initial sender and/or any previous recipients of the digital check, and may instead display only the current sender/recipient of the digital check. In some instances, the digital check may include the embedded digital chip indicating that the checks are validated (e.g., that the initial payor has sufficient funds to allow processing of the checks). In some instances, the enterprise application host platform 102 may modify the digital check itself. In other instances, the enterprise application host platform 102 may generate a new version of the digital check (e.g., a second digital check), which may be configured for processing at point of sale devices.

In some instances, in addition or as an alternative to configuring a digital check image, the enterprise application host platform 102 may generate or otherwise access (e.g., from the distributed ledger) a QR code representative of the digital check, which may, e.g., be configured for processing at a point of sale device. Additionally or alternatively, the enterprise application host platform 102 may deposit or otherwise move the funds of the digital check into an electronic wallet, mobile pay account, and/or other account that may be accessed by a point of sale device from a user device. In any of the above instances, once the digital check is configured for processing at a point of sale device, the enterprise application host platform 102 and/or the distributed ledger host system 103 may update the distributed ledger to include any additional modifications/configurations of the digital check.

In some instances, the enterprise application host platform 102 may identify a geographic location of the user device 104 (e.g., at predetermined time intervals), and may identify one or more merchant services at or near the geographic location. In these instances, the enterprise application host platform 102 may communicate with the user device 104 to present the one or more merchant services as selectable options to the first user (e.g., as shown in graphical user interface 405 of FIG. 4), and receive user input indicating a merchant service selection. Additionally or alternatively, the user device 104 may receive a selection of a merchant/enterprise via a friends list displayed within an application running at the user device 104 and supported by and/or otherwise affiliated with an enterprise of the enterprise application host platform 102 (e.g., a mobile banking application). Additionally or alternatively, the enterprise application host platform 102 may automatically identify a merchant service for the first user. In either instance, the enterprise application host platform 102 may configure the digital check for use at a point of sale device associated with the identified merchant service (e.g., assign the identified merchant service as a check recipient, or the like).

At step 208, the enterprise application host platform 102 may send digital check information to the user device 104, which may, e.g., enable the user device 104 to execute transactions with point of sale devices using the digital check. For example, in some instances, the enterprise application host platform 102 may communicate with a mobile banking application running on the user device 104. In some instances, in sending the digital check information, the enterprise application host platform 102 may send the digital check itself. Additionally or alternatively, the enterprise application host platform 102 may send a QR code representative of the digital check. Additionally or alternatively, the enterprise application host platform 102 may send information to update a mobile wallet, mobile pay application, and/or otherwise update a balance of funds available for transfer. Additionally or alternatively, the enterprise application host platform 102 and/or distributed ledger host system 103 may grant the user device 104 access to the distributed ledger.

In some instances, in granting the access to the distributed ledger, the enterprise application host platform 102 and/or the distributed ledger host system 103 may grant full ledger access to the first user. In other instances, the enterprise application host platform 102 and/or the distributed ledger host system 103 may grant partial access to the first user, so as to permit the first user to view only a portion of the ledger that includes information specific to that user (e.g., the recipient might not be able to access information of the transfer from the initial payor to any prior recipients). In some instances the enterprise application host platform 102 may send the digital check information to the user device 104 via the communication interface 113 and while the first connection is established.

At step 209, the user device 104 may receive the digital check information. For example, the user device 104 may receive the digital check information while the first connection is established.

At step 210, the enterprise application host platform 102 may establish a connection with the user device 104. For example, the enterprise application host platform 102 may establish a third connection with the user device 104 to link the enterprise application host platform 102 with the user device 104 (e.g., in preparation for executing a transaction between the user device 104 and the first point of sale device 105). In some instances, the enterprise application host platform 102 may identify whether or not a connection is already established with the first point of sale device 105. If a connection is already established with the first point of sale device 105, the user device 104 might not re-establish the connection. If a connection is not yet established with the first point of sale device 105, the user device 104 may establish the third connection as described herein.

Figure 2C:
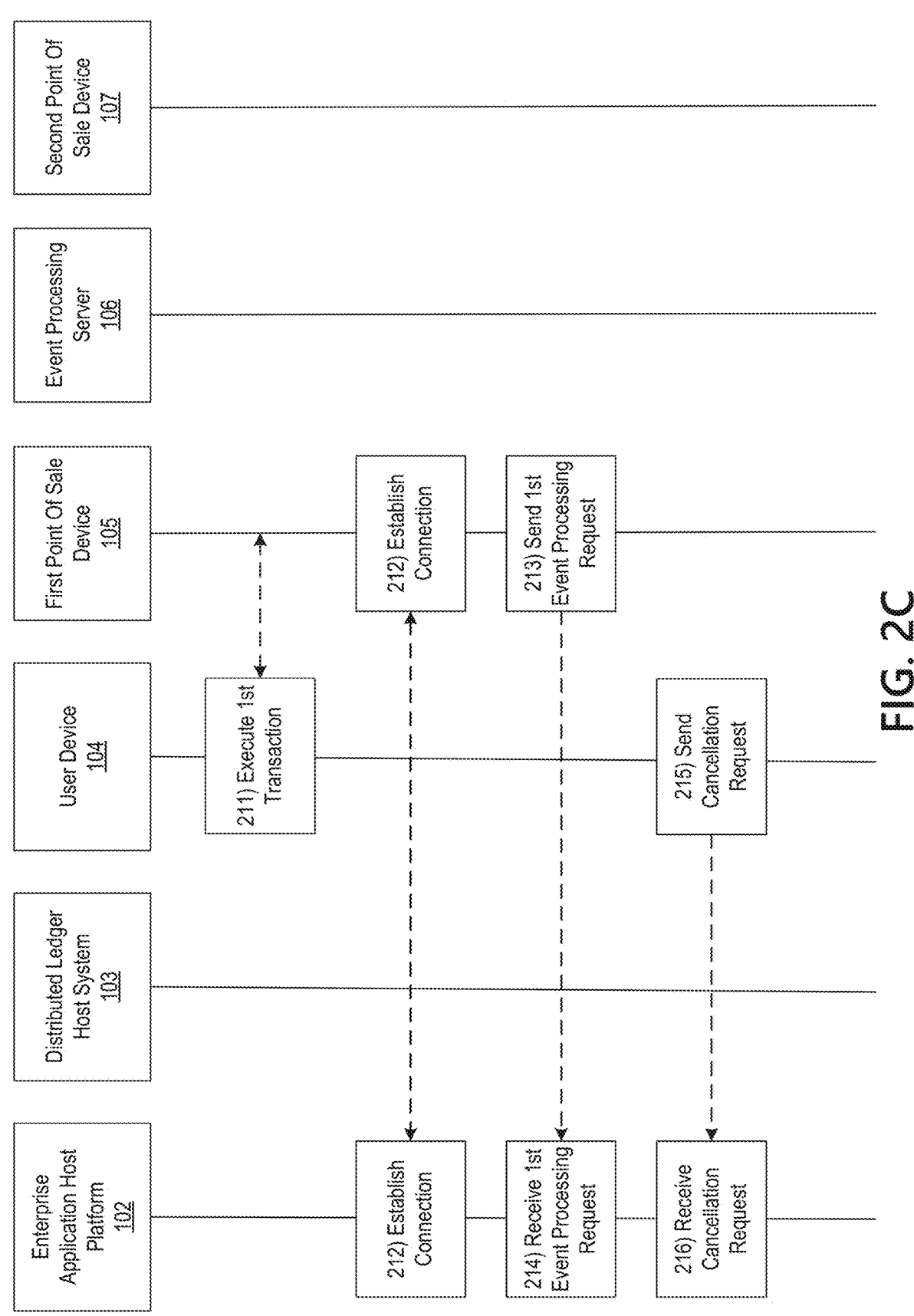
Figure 5:
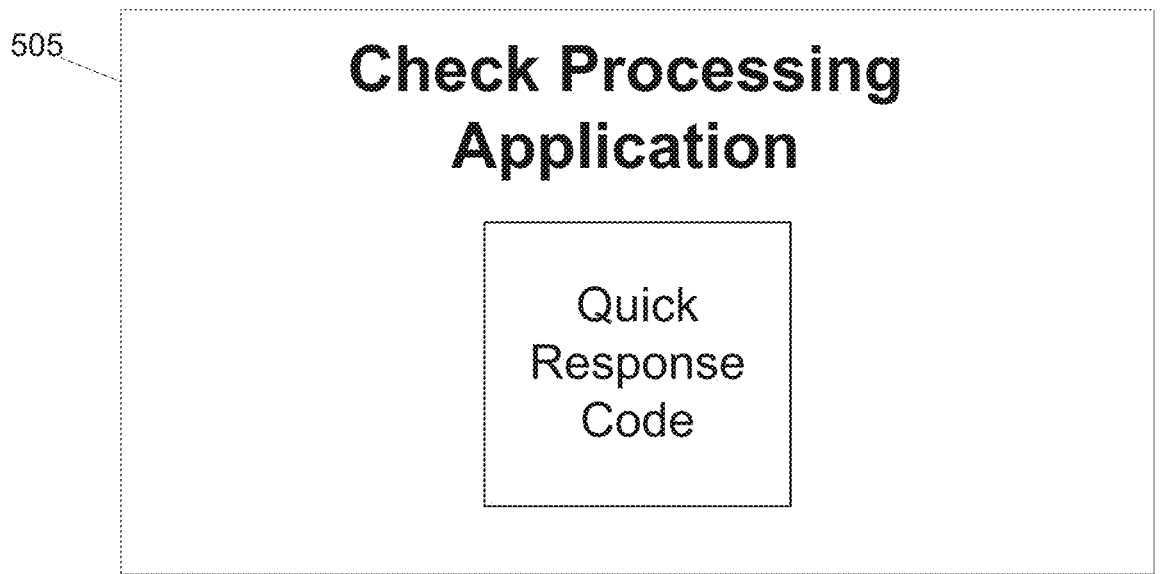

Referring to FIG. 2C, at step 211, the user device 104 may execute a first transaction with the first point of sale device 105. For example, the user device 104 may communicate with the first point of sale device 105 to provide event processing information. In some instances, to do so, the first point of sale device 105 may scan a QR code, displayed at the user device 104 (e.g., as shown in graphical user interface 505, which is shown in FIG. 5), to identify information of the digital check. Additionally or alternatively, the first point of sale device 105 may capture an image of the digital check, displayed at the user device 104, and may perform one or more text recognition and/or natural language processing functions to identify the information of the digital check. Additionally or alternatively, the user device 104 may use a stored electronic wallet, mobile pay account, or the like to execute the transaction with the first point of sale device 105. In some instances, the communication between the user device 104 and the first point of sale device 105 may be performed through a touch, tap, signal, and/or otherwise between the user device 104 and the first point of sale device 105. In some instances, in communicating with the first point of sale device 105, the user device 104 may provide the first point of sale device 105 with information of the digital check that the first point of sale device 105 may use to cause a transfer of funds from the initial payor to an account of an enterprise of the first point of sale device 105.

In some instances, in communicating with the first point of sale device 105, the user device 104 may include an authentication identifier such as a retina scan, a fingerprint, a digital signature, facial authentication, biometric authentication, multi-factor authentication input, and/or otherwise, indicating authorization, granted by the first user and to the enterprise of the first point of sale device 105, to access funds of the digital check. In some instances, the user device 104 may authorize the first point of sale device 105 to access all funds corresponding to the digital check, or a portion of the funds of the digital check (e.g., the purchased goods or services may cost less than the value of the digital check). In instances where only a portion of the funds are to be used by the enterprise of the first point of sale device 105, the user device 104 may retain access to the remaining funds (e.g., for use in a subsequent transaction). In some instances, in executing the first transaction, the user device 104 may communicate a combination of check information and information of another financial source (e.g., credit card, bank account, and/or other source). For example, if the purchased goods or services cost more than the value of the digital check, additional sources of funds may be used to supplement the digital check. In these instances, the additional source of funds may be pre-selected or otherwise configured by the first user (e.g., user of the user device 104).

At step 212, the first point of sale device 105 may establish a connection with the enterprise application host platform 102. For example, the first point of sale device 105 may establish a fourth connection with the enterprise application host platform 102 to link the first point of sale device 105 with the enterprise application host platform 102 (e.g., in preparation for sending event processing requests). In some instances, the first point of sale device 105 may identify whether a connection is already established with the enterprise application host platform 102. If a connection is already established with the enterprise application host platform 102, the first point of sale device 105 might not re-establish the connection. If the connection is not yet established with the enterprise application host platform 102, the first point of sale device 105 may establish the fourth connection as described herein.

At step 213, the first point of sale device 105 may send the first event processing request to the enterprise application host platform 102. For example, the first point of sale device 105 may send the first event processing request to the enterprise application host platform 102 while the fourth connection is established. For example, in sending the first event processing request, the first point of sale device 105 may send a request to transfer all or a portion of the funds of the digital check from an account of the initial payor to an account of an enterprise or merchant associated with the first point of sale device 105.

At step 214, the enterprise application host platform 102 may receive the first event processing request, sent at step 213. For example, the enterprise application host platform 102 may receive the first event processing request via the communication interface 113 and while the fourth connection is established.

At step 215, the user device 104 may send a cancellation request to the enterprise application host platform 102. For example, the user device 104 may send a request to cancel the first transaction, and to claw back or otherwise void the transfer of the digital check. In some instances, the use of a digital check may offer security benefits over traditional methods of electronic payment. For example, digital checks (in a similar manner as physical checks) may be tracked, voided, cancelled, and/or otherwise modified to revoke a payment (e.g., in the event a service or good is not properly received in exchange for the corresponding funds). In contrast, otherwise recouping such funds in a traditional electronic payment may be more difficult (e.g., as the recipient of the funds may simply be relied on to recoup them).

At step 216, the enterprise application host platform 102 may receive the cancellation request sent at step 213. For example, the enterprise application host platform 102 may receive the cancellation request via the communication interface 113 and while the first wireless data connection is established.

Figure 2D:
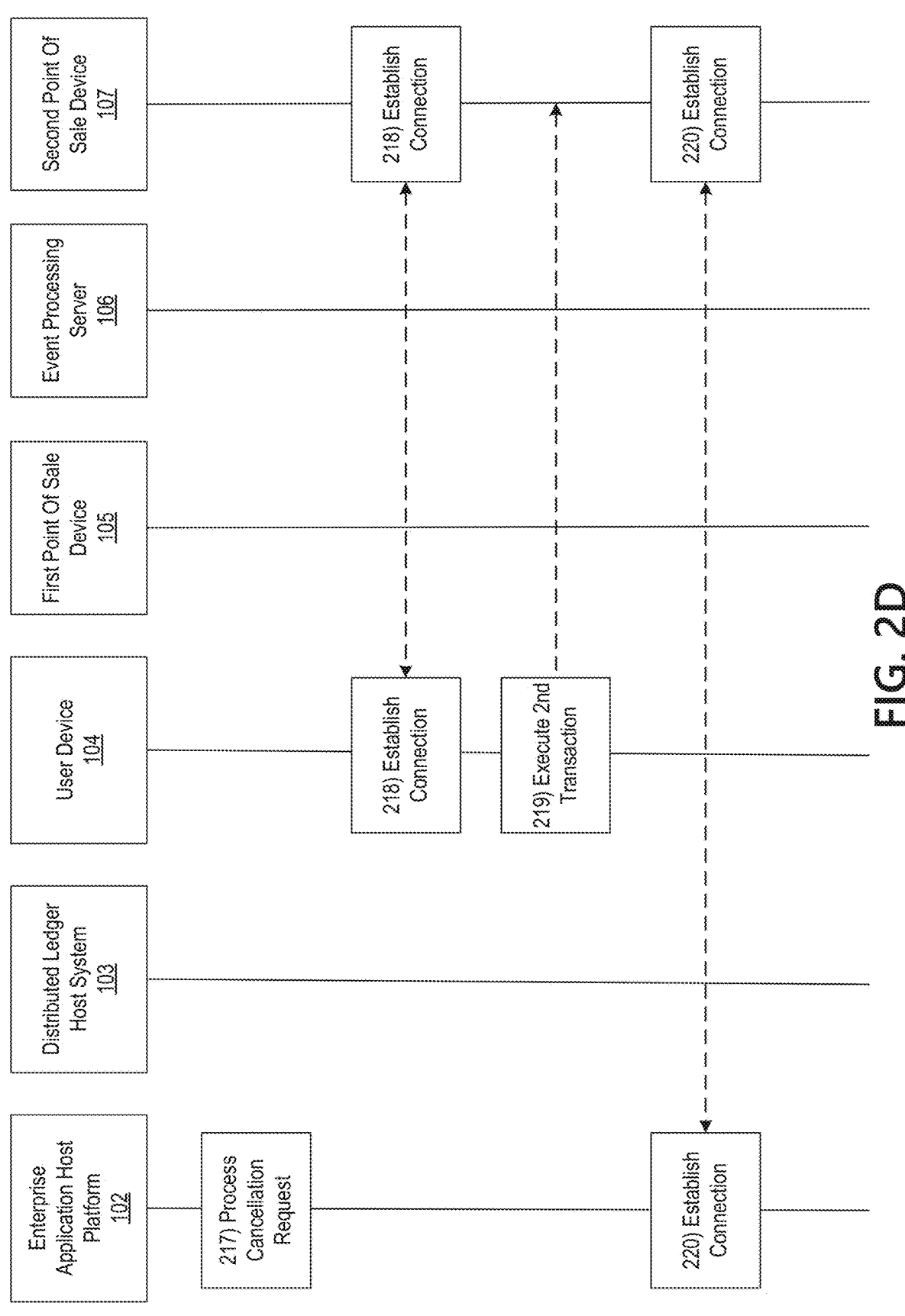

Referring to FIG. 2D, at step 217, the enterprise application host platform 102 may process the cancellation request received at step 216. For example, the enterprise application host platform 102 may determine whether or not a predetermined period of time has expired since the first transaction was conducted with the first point of sale device 105. In these instances, if the predetermined period of time has expired, the enterprise application host platform 102 might not cancel the request (and instead, may process the first requested event as described below with regard to the second event processing request in steps 225-228). Otherwise, if the predetermined period of time has not expired, the enterprise application host platform 102 may cancel the first transaction, and thus might not direct the movement of any funds to the merchant or enterprise of the first point of sale device 105. In some instances, the enterprise application host platform 102 may analyze additional criteria in determining whether or not to cancel the first transaction (e.g., transaction value, reason for cancellation, prior cancellation history for either party, and/or other information).

At step 218, the user device 104 may establish a connection with the second point of sale device 107. For example, the user device 104 may establish a fifth connection to link the user device 104 to the second point of sale device 107 (e.g., in preparation for executing a second transaction). In some instances, the user device 104 may identify whether or not a connection is already established with the second point of sale device 107. If a connection is already established with the second point of sale device 107, the user device 104 might not re-establish the connection. If a connection is not yet established with the second point of sale device 107, the user device 104 may establish the fifth connection as described herein.

At step 219, the user device 104 may execute a second transaction with the second point of sale device 107. For example, the user device 104 may communicate with the second point of sale device 107 to provide event processing information. In some instances, to do so, the second point of sale device 105 may scan a QR code, displayed at the user device 104 (e.g., as shown in graphical user interface 505, which is shown in FIG. 5), to identify information of the digital check. Additionally or alternatively, the second point of sale device 107 may capture an image of the digital check, displayed at the user device 104, and may perform one or more text recognition and/or natural language processing functions to identify the information of the digital check. Additionally or alternatively, the user device 104 may use a stored electronic wallet, mobile pay account, or the like to execute the transaction with the second point of sale device 107. In some instances, the communication between the user device 104 and the second point of sale device 107 may be performed through a touch, tap, signal, and/or otherwise between the user device 104 and the second point of sale device 107. In some instances, in communicating with the second point of sale device 107, the user device 104 may provide the second point of sale device 107 with information of the digital check that the second point of sale device 107 may use to cause a transfer of funds from the initial payor to an account of a merchant or enterprise of the second point of sale device 107.

In some instances, in communicating with the first point of sale device 105, the user device 104 may include an authentication identifier such as a retina scan, a fingerprint, a digital signature, facial authentication, biometric authentication, multi-factor authentication input, and/or otherwise, indicating authorization, granted by the first user and to the merchant or enterprise of the first point of sale device 105, to access funds of the digital check. In some instances, the user device 104 may authorize the first point of sale device 105 to access all funds corresponding to the digital check, or a portion of the funds of the digital check (e.g., the purchased goods or services may cost less than the value of the digital check). In instances where only a portion of the funds are to be used by the merchant or enterprise of the first point of sale device 105, the user device 104 may retain access to the remaining funds (e.g., for use in a subsequent transaction). In some instances, in executing the first transaction, the user device 104 may communicate a combination of check information and information of another financial source (e.g., credit card, bank account, and/or other source). For example, if the purchased goods or services cost more than the value of the digital check, additional sources of funds may be used to supplement the digital check. In these instances, the additional source of funds may be pre-selected or otherwise configured by the first user (e.g., user of the user device 104).

At step 220, the second point of sale device 107 may establish a connection with the enterprise application host platform 102. For example, the second point of sale device 107 may establish a sixth connection with the enterprise application host platform 102 to link the second point of sale device 107 to the enterprise application host platform 102 (e.g., in preparation for sending a second event processing request). In some instances, the second point of sale device 107 may identify whether or not a connection is already established with the enterprise application host platform 102. If a connection is already established with the enterprise application host platform 102, the second point of sale device 107 might not re-establish the connection. If a connection is not yet established with the enterprise application host platform 102, the second point of sale device 107 may establish the sixth connection as described herein.

Figure 2E:
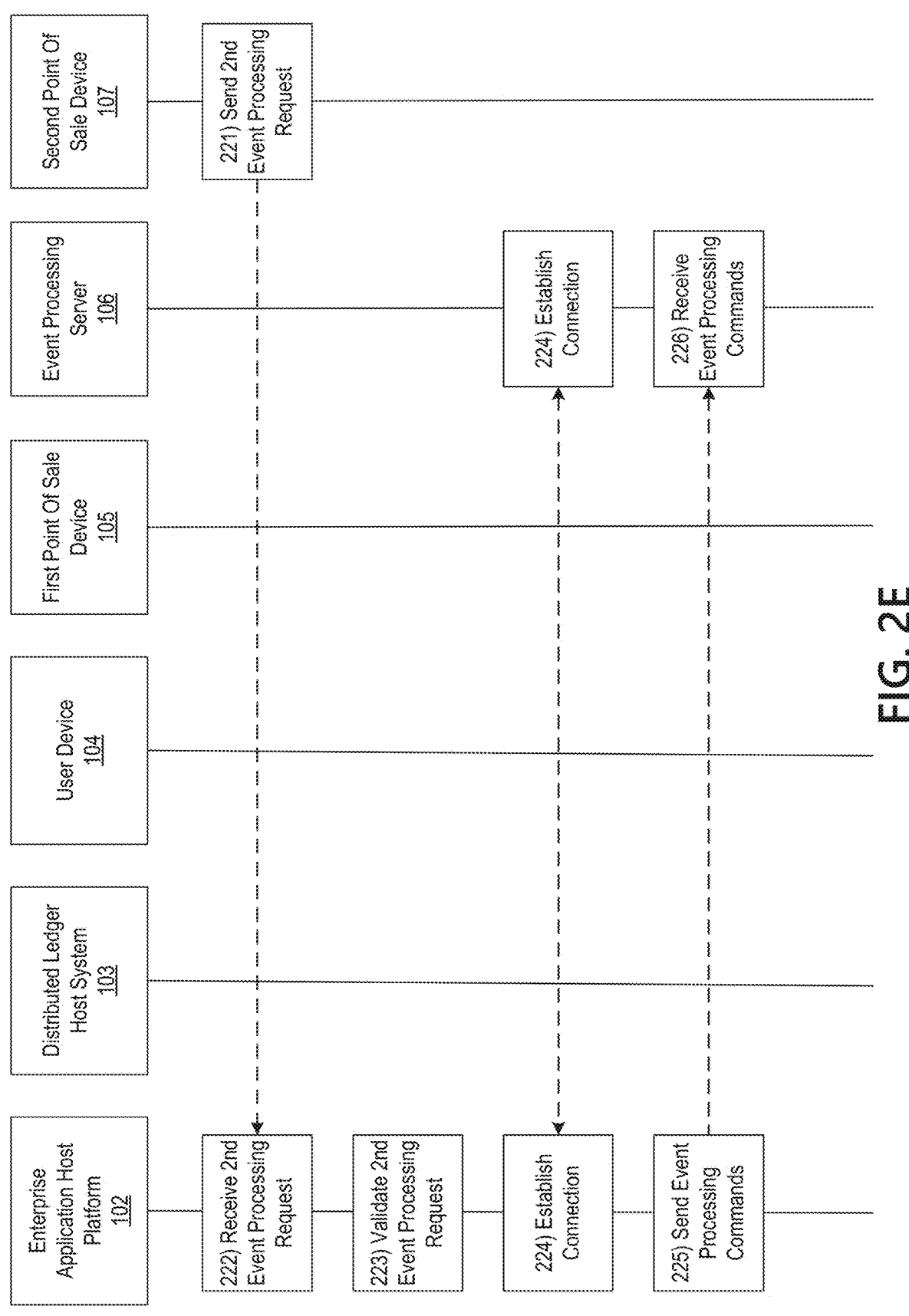

Referring to FIG. 2E, at step 221, the second point of sale device 107 may send the second event processing request to the enterprise application host platform 102. For example, the second point of sale device 107 may send the second event processing request to the enterprise application host platform 102 while the fourth connection is established. For example, in sending the second event processing request, the second point of sale device 107 may send a request to transfer all or a portion of the funds of the digital check from an account of the initial payor to an account of an enterprise or enterprise associated with the second point of sale device 107.

At step 222, the enterprise application host platform 102 may receive the second event processing request, sent at step 221. For example, the enterprise application host platform 102 may receive the second event processing request via the communication interface 113 and while the sixth connection is established.

At step 223, the enterprise application host platform 102 may validate the first event processing request. For example, the enterprise application host platform 102 may validate the digital chip and/or watermark in the digital check, which may indicate that the initial payor (e.g., who issued the initial check which was captured in the check image at step 201), is in possession of sufficient funds for the digital check to be executed. For example, funds of the initial payor may be verified (rather than funds of the first user) because the first user may be routing funds to the merchant or enterprise of the second point of sale device 107 without depositing them in the account of the first user.

Additionally or alternatively, the enterprise application host platform 102 may validate the second event processing request using the distributed ledger. For example, the enterprise application host platform 102 and/or distributed ledger host system 103 may examine the distributed ledger, which may indicate a value of available funds corresponding to the digital check, and may identify whether these available funds are sufficient.

Additionally or alternatively, the enterprise application host platform 102 and/or distributed ledger host system 103 may validate the merchant or enterprise of the second point of sale device 107 (e.g., that it is the valid recipient of the digital check). For example, the enterprise application host platform 102 and/or distributed ledger host system 103 may validate the merchant or enterprise of the second point of sale device 107 based on the digital check and/or using the distributed ledger. Additionally or alternatively, the enterprise application host platform 102 may verify that the second transaction was authorized by the first user (e.g., by validating a retina scan, facial authentication, fingerprint, digital signature, biometric authentication, multi-factor authentication input, and/or other information received from the first user, confirming an intent to execute the second transaction). In some instances, the enterprise application host platform 102 may identify whether a value of the second transaction meets or exceeds a validation threshold. If the enterprise application host platform 102 identifies that the second transaction does meet or exceed the validation threshold, the enterprise application host platform 102 may validate the second event processing request as described above. Otherwise, if the second transaction does not meet or exceed the validation threshold, the enterprise application host platform 102 might not validate the second event processing request (or may perform the validation to a lesser degree).

If the enterprise application host platform 102 and/or distributed ledger host system 103 does validate the second event processing request, the enterprise application host platform 102 may proceed to step 224. If the enterprise application host platform 102 and/or distributed ledger host system 103 does not validate the second event processing request, the second event processing request may be denied (e.g., steps 224-228 might not be performed).

At step 224, the enterprise application host platform 102 may establish a connection with the event processing server 106. For example, the enterprise application host platform 102 may establish a seventh connection with the event processing server 106 to link the enterprise application host platform 102 with the event processing server 106 (e.g., in preparation for sending event processing commands). In some instances, the enterprise application host platform 102 may identify whether or not a connection is already established with the event processing server 106. If a connection is already established with the event processing server 106, the enterprise application host platform 102 might not re-establish the connection. If a connection is not yet established with the event processing server 106, the enterprise application host platform 102 may establish the seventh connection as described herein.

At step 225, the enterprise application host platform 102 may send one or more event processing commands directing the event processing server 106 to transfer funds (e.g., corresponding to the digital check and sufficient to finalize the second transaction) from an account of the initial payor to an account of the enterprise or merchant of the second point of sale device 107. In some instances, the enterprise application host platform 102 may send the one or more event processing commands to the event processing server 106 via the communication interface 113 and while the seventh connection is established. In some instances, the enterprise application host platform 102 may automatically send the one or more event processing commands without receiving an event processing request from the second point of sale device 107. For example, the enterprise application host platform 102 may monitor communications between the user device 104 and the second point of sale device 107, and may send the event processing commands in response to detecting the occurrence of a transaction. In doing so, the enterprise application host platform 102 may cause funds, associated with the digital check, to be deposited from an account of the initial payor into the account of the enterprise merchant associated with the second point of sale device 107 (e.g., without transferring them into an account of the first user).

In some instances, in sending the event processing commands, the enterprise application host platform 102 may direct the event processing server 106 to transfer all or a portion of the funds corresponding to the digital check. In some instances, in sending the event processing commands, the enterprise application host platform 102 may direct the event processing server 106 to transfer portions of the funds corresponding to the digital check to different entities. For example, when communicating to execute the second transaction, the second point of sale device 107 may present an option to make a donation to a charity, or otherwise present additional options. If selected, a portion of the funds for the digital check may be sent directly to an account of the charity (in addition to funds sent to the account of the enterprise/merchant of the second point of sale device 107). Additionally or alternatively, an additional enterprise may have a revenue or profit sharing agreement with the enterprise/merchant of the second point of sale device 107, and a portion of the funds of the second transaction may be routed to an account of this additional enterprise. In some instances, in sending the event processing commands, the enterprise application host platform 102 may direct the event processing server 106 to transfer the funds of the digital check as well as additional funds (e.g., from a bank account, credit card, and/or otherwise) if the funds of the digital check are insufficient to complete the second transaction.

In some instances, the enterprise application host platform 102 may send the one or more event processing commands to the event processing server 106 via the communication interface 113 and while the seventh connection is established.

At step 226, the event processing server 106 may receive the event processing commands sent at step 225. For example, the event processing server 106 may receive the event processing commands while the seventh connection is established.

Figure 2F:
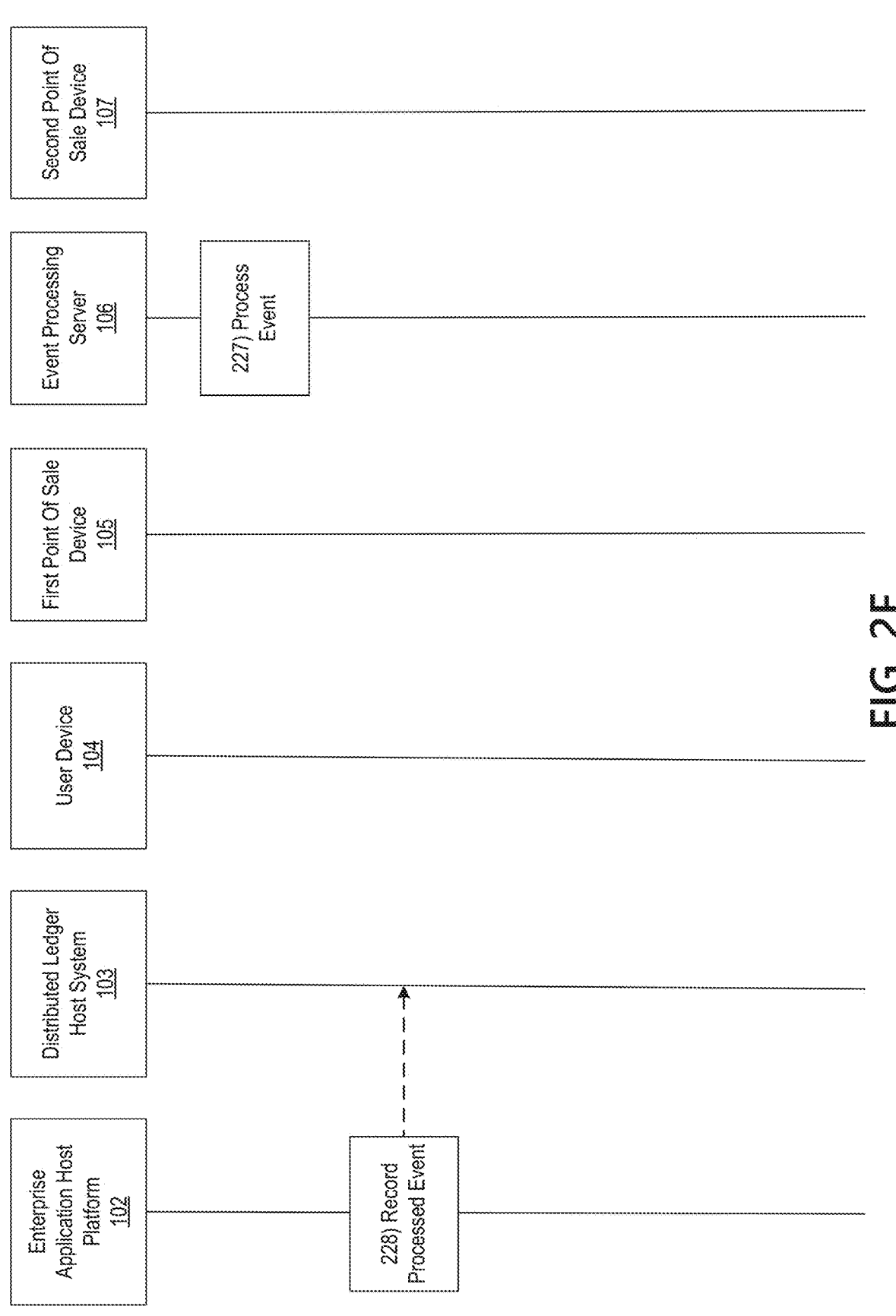

Referring to FIG. 2F, at step 227, based on or in response to the one or more event processing commands received at step 226, the event processing server 106 may process the second event. For example, the event processing server 106 may execute a transfer of funds from an account of the initial payor to the account of the merchant/enterprise of the second point of sale device 107. For example, the event processing server 106 may transfer funds of the digital check in full or in part to one or more accounts (e.g., the account of the merchant/enterprise of the second point of sale device 107 and/or other accounts). In some instances, if the digital check is transferred in full, a remaining portion of the funds for the digital check may deposited into a user's account (e.g., deposit a remaining portion in the customer's own accounts).

At step 228, the enterprise application host platform 102 may communicate with the distributed ledger host system 103 to record the processed event. For example, the enterprise application host platform 102 and/or distributed ledger host system 103 may modify the distributed ledger to include a new block that includes the value of the digital check and the corresponding recipient (e.g., $150 deposited in account of the second merchant/enterprise; remaining check value: $0, or the like), as shown in the third block of the distributed ledger 605. In some instances, In some instances, where a transfer of only a portion of the funds is performed, the enterprise application host platform 102 may update the distributed ledger and/or the digital check to reflect a remaining balance of the digital check (e.g., update the balance from $150 to $100 if only $50 are transferred).

Alternatively, if the transaction was unsuccessful (e.g., as described above with regard to the first transaction, the enterprise application host platform 102 and/or distributed ledger host system 103 may modify the distributed ledger to include a new block that indicates the failed transaction (e.g., as shown in the second block of distributed ledger 605).

In some instances, the enterprise application host platform 102 may record transfers to multiple recipients on the distributed ledger (e.g., in instances where a payment is made to multiple parties). In some instances, the enterprise application host platform 102 and/or distributed ledger host system 103 may record the processed event on a single branch of the distributed ledger, representative of the transfers to both parties. In other instances, the enterprise application host platform 102 and/or distributed ledger host system 103 may record the transfers to each different party on a different branch of the distributed ledger. In some instances, in modifying the distributed ledger, the enterprise application host platform 102 and/or distributed ledger host system 103 may modify a blockchain, holochain, and/or other distributed ledger.

In some instances, the initial payor and/or first user may have access to the distributed ledger, and may be able to view the recorded processed event so as to verify that funds of the transferred check have been transferred, deposited, or otherwise used in an approved or otherwise intended manor.

Although the use of watermarks, digital chips, and distributed ledgers are described throughout the illustrative event sequence, these methods may be used independently (where the remaining methods may be optional) or in combination with each other without departing from the scope of the disclosure. Furthermore, although two point of sale devices are described, this is for illustrative purposes only, and any number of point of sale devices may be involved in the above described methods without departing from the scope of the disclosure.

By using the methods described above, checks may be automatically transferred to merchants/enterprise at a point of sale, thus eliminating the need to first cash a received check and subsequently use the deposited funds to execute a transaction. This may be particularly advantageous for individuals who do not have a traditional banking account into which checks may be easily deposited. Additionally, the security benefits of traditional checks may be achieved, such as clawback, cancellation, and/or tracking benefits, which might not be available in traditional electronic transfers. Furthermore, funds of a check may be disbursed to multiple parties for automated deposit. Additionally, by involving the use of distributed ledgers in these methods, the security advantages of an immutable ledger may be achieved in the check transfer process. As yet an additional benefit, by using digital checks in this way, transaction limits, which may limit the transaction amounts of conventional electronic transfers, might not limit an amount of funds that may be transferred electronically (e.g., because checks might not have a transfer limit).

Figure 7:
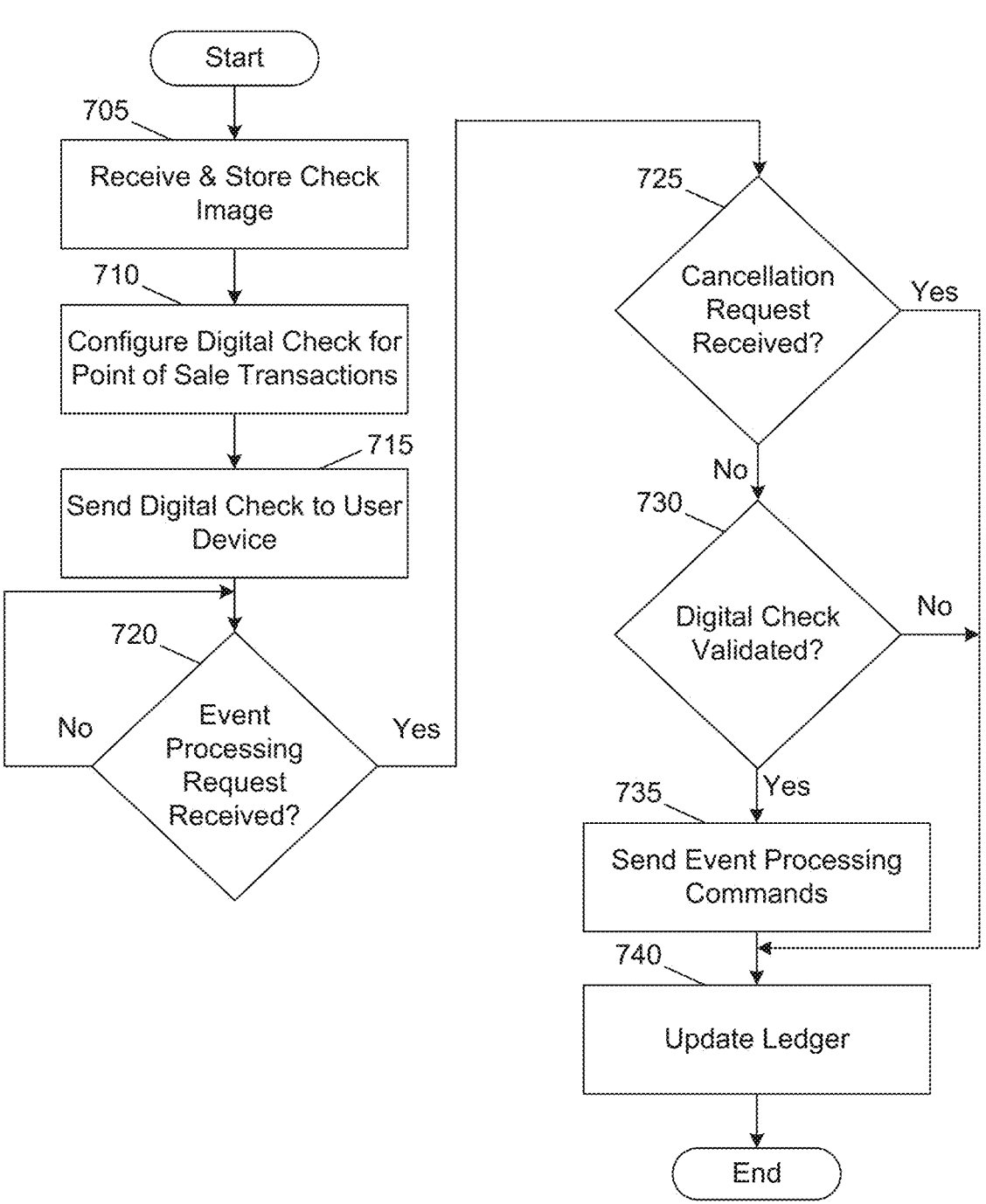
FIG. 7 depicts an illustrative method for executing digital check disbursements with point of sale devices in accordance with one or more example embodiments.

FIG. 7 depicts an illustrative method for executing digital check disbursements with point of sale devices in accordance with one or more example embodiments. Referring to FIG. 7, at step 705, a computing platform including one or more processors, memory, and a communication interface may receive and store a check image. At step 710, the computing platform may configure the digital check for point of sale transactions. At step 715, the computing platform may send the digital check to a user device. At step 720, the computing platform may identify whether or not an event processing request is received. If an event processing request is not received, the computing platform might not proceed and may return to step 720 to continue monitoring for an event processing request. Otherwise, if an event processing request is received, the computing platform may proceed to step 725. At step 725, the computing platform may identify whether a cancellation request is received. If a cancellation request is received, the computing platform may proceed to step 740. If a cancellation request is not received, the computing platform may proceed to step 730.

At step 730, the computing platform may identify whether or not the digital check is validated. If the digital check is not validated, the computing platform may proceed to step 740. If the digital check is validated, the computing platform may proceed to step 735.

At step 735, the computing platform may send one or more commands directing an event processing system to execute a transfer of funds. At step 740 the computing platform may communicate with a distributed ledger host platform to record whether or not the requested event was successfully processed.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

configure, based on a check image depicting a check from an initial payor to a recipient user corresponding to a user device, a digital check for use in conducting transactions between the user device and one or more point of sale devices, wherein configuring the digital check further comprises:

embedding a digital chip into the digital check, and redacting information of an initial sender and any previous recipients of the digital check, and instead displaying a current sender and current recipient;

send, to the user device, the digital check, wherein sending the digital check to the user device enables the user device to execute a transaction with a first point of sale device of the one or more point of sale devices;

receive, from the first point of sale device, a request to execute the transaction;

send, to an event processing server, one or more commands directing the event processing server to process the transaction, wherein sending the one or more commands directing the event processing server to process the transaction causes the event processing server to execute a transfer of funds from an account of the initial payor to an enterprise account of the first point of sale device, without transferring the funds to an account of the recipient user, and wherein executing the transfer of funds comprises transferring a portion of the funds corresponding to the digital check, wherein the portion of the funds corresponding to the digital check comprises a portion of funds requested in the transaction, and wherein a remaining portion of the funds requested in the transaction are provided from an alternate source, different than the digital check, wherein the alternate source is preconfigured by a user; and adjust the digital check to display the remaining portion of the funds once the portion of the funds has been transferred.

2. The computing platform of claim 1, wherein executing the transaction comprises scanning, by the first point of sale device and from a display of the user device, a quick response (QR) code representative of the check.

3. The computing platform of claim 1, wherein the memory stores additional computer-readable instructions that, when executed by the at least one processor, cause the computing platform to:

validate, after receiving the request to execute the transaction, the digital check, wherein validating the digital check comprises verifying one of more of:

an account of the initial payor has sufficient funds to support a deposit of the digital check, or an enterprise corresponding to the first point of sale device is an intended recipient of the digital check.

4. The computing platform of claim 3, wherein validating the digital check comprises one or more of:

validating, using a distributed ledger corresponding to the digital check, the digital check, or validating, using a digital chip embedded in the digital check, the digital check.

5. The computing platform of claim 4, wherein the memory stores additional computer-readable instructions that, when executed by the at least one processor, cause the computing platform to:

modify, after execution of the transfer of funds from the account of the initial payor to the enterprise account of the first point of sale device, the distributed ledger to indicate the transfer of the funds.

6. The computing platform of claim 1, wherein executing the transfer of funds comprises transferring a portion of the funds corresponding to the digital check.

7. The computing platform of claim 1, wherein configuring, the digital check for use in conducting transactions between the user device and the one or more point of sale devices comprises:

identifying a geolocation of the user device;

identifying, based on the geolocation of the user device, one or more enterprises;

sending, to the user device, a notification of the one or more enterprises; and based on receiving a user input selecting an enterprise of the one or more enterprises, configuring the digital check for use in conducting transactions between the user device and a point of sale device associated with the enterprise.

8. The computing platform of claim 1, wherein the one or more point of sale devices are uniquely configured to process digital checks from an enterprise associated with the computing platform.

9. The computing platform of claim 1, wherein configuring the digital check comprises depositing funds of the digital check into a mobile pay application of the user device.

10. The computing platform of claim 1, wherein funds of the digital check are not deposited to an account of the recipient user.

11. The computing platform of claim 1, wherein the memory stores additional computer-readable instructions that, when executed by the at least one processor, cause the computing platform to:

receive, from the user device and after receiving a request to execute a second transaction from a second point of sale device, a check transfer cancellation request, wherein the check transfer cancellation request requests cancellation of transfer of the digital check; and cancel, without causing a transfer of funds from the account of the initial payor to an enterprise account of the second point of sale device, the second transaction.

12. The computing platform of claim 11, wherein the check transfer cancellation request is received within a predetermined time period after receipt of the request to execute the second transaction.

13. The computing platform of claim 1, wherein configuring the digital check comprises generating a QR code representative of the check.

14. A method comprising:

at a computing platform comprising at least one processor, a communication interface, and memory:

configuring, based on a check image depicting a check from an initial payor to a recipient user corresponding to a user device, a digital check for use in conducting transactions between the user device and one or more point of sale devices, wherein configuring the digital check further comprises:

embedding a digital chip into the digital check, and redacting information of an initial sender and any previous recipients of the digital check, and instead displaying a current sender and current recipient;

sending, to the user device, the digital check, wherein sending the digital check to the user device enables the user device to execute a transaction with a first point of sale device of the one or more point of sale devices;

receiving, from the first point of sale device, a request to execute the transaction;

sending, to an event processing server, one or more commands directing the event processing server to process the transaction, wherein sending the one or more commands directing the event processing server to process the transaction causes the event processing server to execute a transfer of funds from an account of the initial payor to an enterprise account of the first point of sale device, without transferring the funds to an account of the recipient user, and wherein executing the transfer of funds comprises transferring a portion of the funds corresponding to the digital check, wherein the portion of the funds corresponding to the digital check comprises a portion of funds requested in the transaction, and wherein a remaining portion of the funds requested in the transaction are provided from an alternate source, different than the digital check, wherein the alternate source is preconfigured by a user; and adjusting the digital check to display the remaining portion of the funds once the portion of the funds has been transferred.

15. The method of claim 14, wherein executing the transaction comprises scanning, by the first point of sale device and from a display of the user device, a quick response (QR) code representative of the check.

16. One or more non-transitory computer-readable media storing instructions that, when executed by a computing platform comprising at least one processor, a communication interface, and memory, cause the computing platform to:

configure, based on a check image depicting a check from an initial payor to a recipient user corresponding to a user device, a digital check for use in conducting transactions between the user device and one or more point of sale devices, wherein configuring the digital check further comprises:

embedding a digital chip into the digital check, and redacting information of an initial sender and any previous recipients of the digital check, and instead displaying a current sender and current recipient;

send, to the user device, the digital check, wherein sending the digital check to the user device enables the user device to execute a transaction with a first point of sale device of the one or more point of sale devices;

receive, from the first point of sale device, a request to execute the transaction;

send, to an event processing server, one or more commands directing the event processing server to process the transaction, wherein sending the one or more commands directing the event processing server to process the transaction causes the event processing server to execute a transfer of funds from an account of the initial payor to an enterprise account of the first point of sale device, without transferring the funds to an account of the recipient user, and wherein executing the transfer of funds comprises transferring a portion of the funds corresponding to the digital check, wherein the portion of the funds corresponding to the digital check comprises a portion of funds requested in the transaction, and wherein a remaining portion of the funds requested in the transaction are provided from an alternate source, different than the digital check, wherein the alternate source is preconfigured by a user; and adjust the digital check to display the remaining portion of the funds once the portion of the funds has been transferred.

\* \* \* \* \*